T. O. DECKER.
AMUSEMENT DEVICE.
APPLICATION FILED APR. 3, 1914.
1,135,099.
Patented Apr. 13, 1915.
2 SHEETS—SHEET 1.
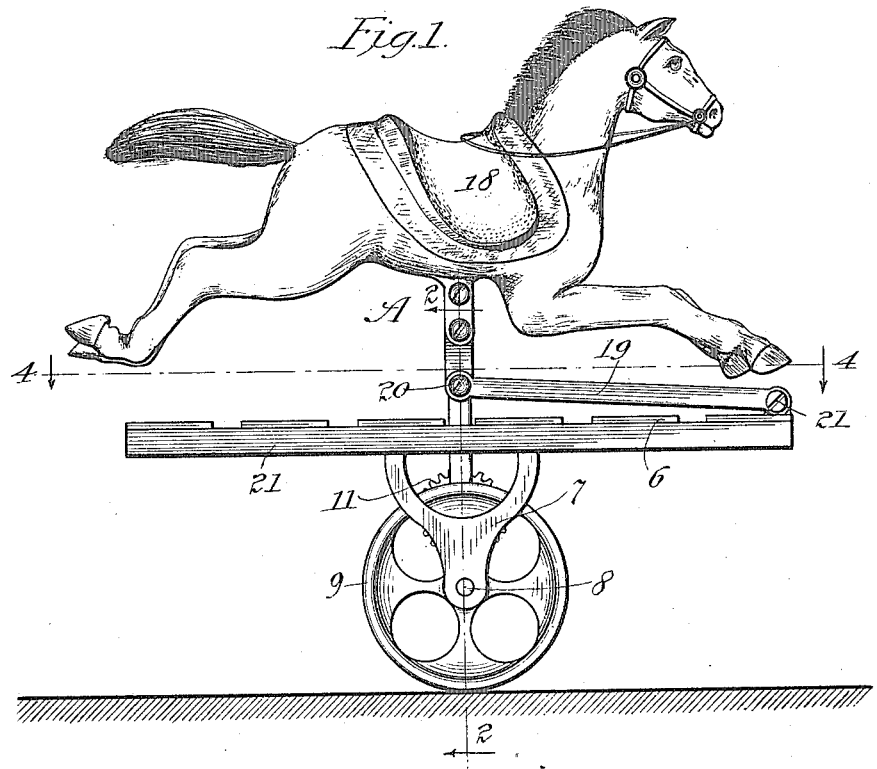
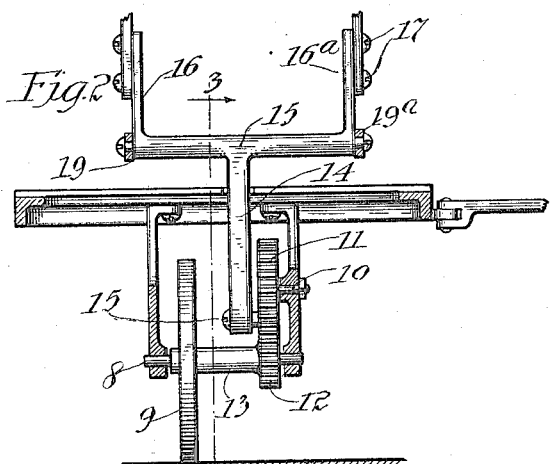
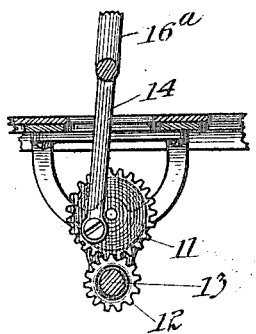
Witnesses:
Inventor:
Thomas O. Decker

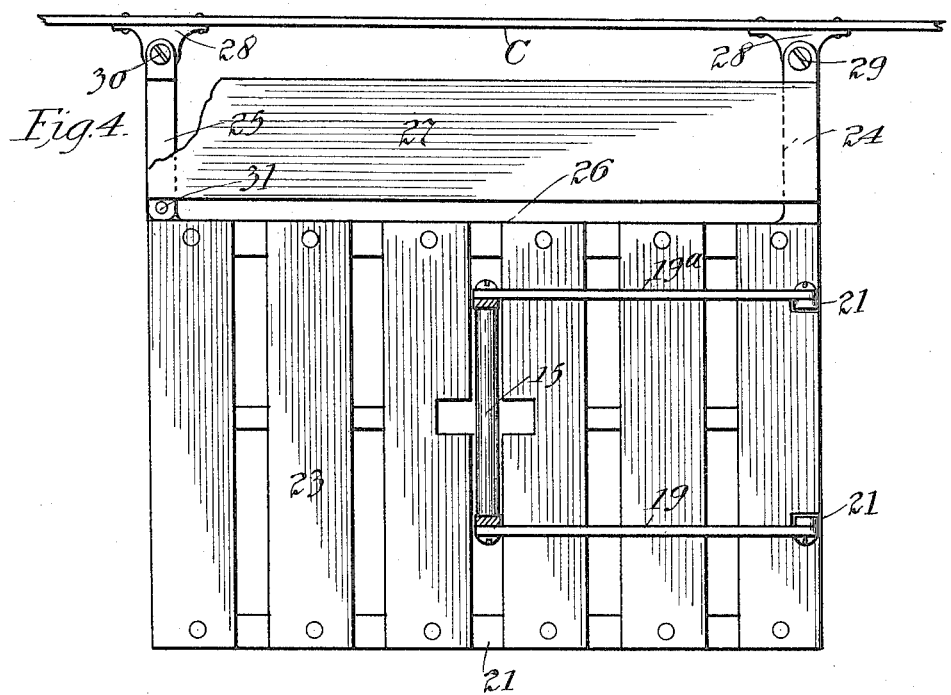
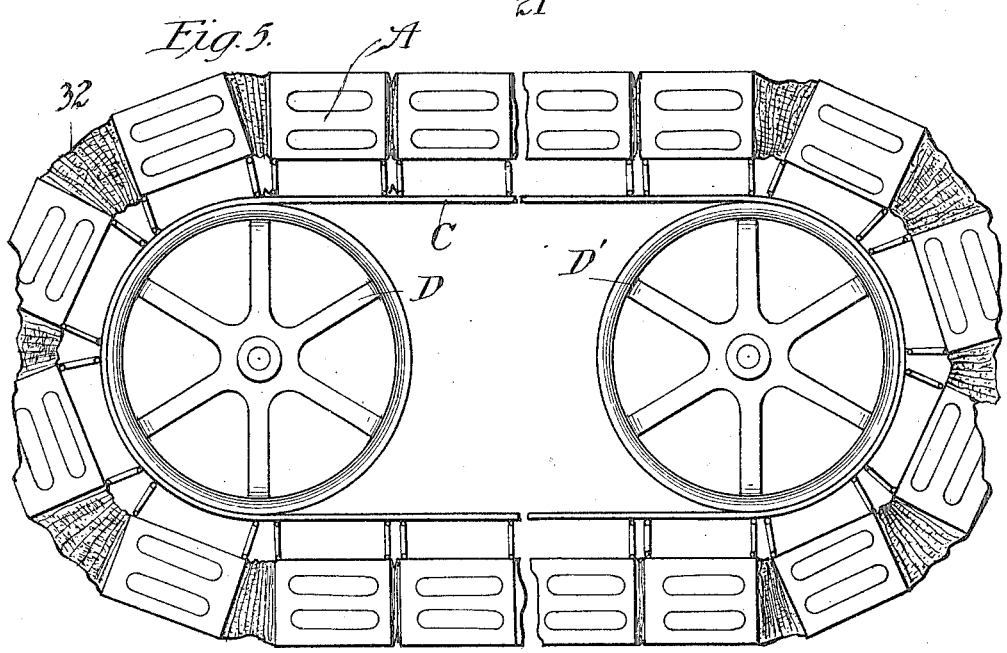

UNITED STATES PATENT OFFICE.

THOMAS O. DECKER, OF CHICAGO, ILLINOIS.

AMUSEMENT DEVICE.

1,135,099. Specification of Letters Patent. Patented Apr. 13, 1915.

Application filed April 3, 1914. Serial No. 829,211.

*To all whom it may concern:*

Be it known that I, THOMAS O. DECKER, a citizen of the United States, residing at Chicago, in the county of Cook and State of Illinois, have invented new and useful Improvements in Amusement Devices, of which the following is a full, clear, concise, and exact description, reference being had to the accompanying drawing, forming a part of this specification.

My invention relates to improvements in amusement devices and has for its object the production of a device in which the motion peculiar to a running animal is imparted to a carrying element or carrier of my device.

A further object is the production of a device in which the desired movement may be imparted to the carrier while the same is traveling in either a straight or curved path.

A further object is the production of a device which can be quickly and easily assembled in any desired series.

A further object is the production of a device using simple and cheap parts that are not easily disarranged or broken and that can be readily repaired.

These and such other objects as may hereinafter appear are attained by my device, an embodiment of which is illustrated in the accompanying drawings, in which—

Figure 1 represents a side elevation of a unit of my device; Fig. 2 represents a front elevation of Fig. 1 with the carrier broken away; Fig. 3 represents a sectional view on the line 3—3 of Fig. 2 looking in the direction indicated by the arrows; Fig. 4 represents a sectional plan view on the line 4—4 of Fig. 1 looking in the direction indicated by the arrows; showing the changed position of the pitman. Fig. 5 represents a top plan view of an amusement device embodying my peculiar features with portions broken away.

Like numerals indicate like parts in the several figures of the drawing.

Referring now to the drawings, especially to Figs. 1 and 5, A represents a unit embodying my peculiar construction adapted to be secured to a cable C passing about large wheels D, D'. It is understood of course that motion is imparted to the wheels in any desired manner in order to cause the separate elements to travel about the wheels.

It is of course understood that instead of using two wheels D, D' with a straight track between, a single large wheel after the order of the merry-go-round may be used. It is also to be understood that I do not limit myself to the assembling of my invention in either of these methods, but may have the various units composing my device assembled separately or in series on any form of a track and actuated by any desired motive power.

Referring now to the unit A, this comprises a platform 6 carrying a supporting yoke frame 7 in which is journaled a shaft 8 supporting the main or carrying wheel 9. A short shaft or pin 10 is also mounted within the yoke on which is mounted the gear wheel 11 meshing with the smaller gear wheel 12 on the shaft 8 and preferably formed integral with the sleeve 13 of the wheel 9. A pitman 14 is mounted at its lower end 15 eccentrically on the gear wheel 11 so that as the carrying wheel 9 is revolved the pitman is given a reciprocating motion up and down and forward and back, the range of motion being regulated by the position at which the lower end of the pitman is secured to the gear 11. This pitman terminates at its upper end in a yoke member comprising a horizontal supporting member 15 and upwardly extending arms 16, 16$^A$.

In practice I find it advisable to make the members 14, 15, 16 and 16$^A$ integral with each other. Rigidly mounted on the tops of the yoke members 16, 16$^A$ by means of bolts 17 are carrying members or carriers 18, the present embodiment being that of a running horse formed of any desired material preferably of wood and leather.

The movement of the pitman forward and back is limited by means of a pair of levers 19, 19$^a$, one end of which 20 is pivotally secured to the end of the horizontal pitman member 15 while the other end is pivotally secured at 21 to a suitable support mounted on the end of the platform 6. It will thus be seen that as the unit A is moved along a track revolving the wheel 9, the carrier 18 is given an oscillatory reciprocatory motion, very much resembling the movement of a galloping or running horse. It is evident that any range of forward and back motion and up and down motion may be obtained by the proper adjustment of the pitman on the gear wheel and of the levers 19.

The reference to Fig. 4 shows that the platform 6 comprises a supporting frame 21 and cross-boards 23 and has an outward rigid extension 24 and at the opposite end a hinge connection 24ª, these two connections extending outwardly from the face 26 of the platform sufficiently to permit the insertion of a running board 27, separating the main platform 6 from the cable C to which the device is attached.

The cable C has secured at proper intervals carrying lugs 28 of any desired form to which are attached the outer end of the rigid member 24 at 29 and the corresponding end of the movable member 25 at 30. This movable member of course is pivoted to the carriage at 31. By this construction it will be noted that while the carriage is maintained at a right angle to the cable while traveling in a straight line, the insertion of the movable link member 25 permits the carriage to travel about a circle or curved track, as shown at Fig. 5.

In order to avoid any danger of persons falling down between the carriages of the various units especially when the device is used on curved surfaces, suitable collapsible members 32 are provided as shown in Fig. 5, no claim being made to any novelty in this portion of my device.

It will be noted that I have shown a pitman as a means of permitting motion from the gears to the carrier. Any other means of transmission in the shape of an eccentric may be substituted for the pitman without in any way departing from the spirit of my invention.

Referring now to the operation of my device, as shown in Fig. 5, it may be mounted as a merry-go-round with large wheels at either end and straight track between or if desired a long straight or curved track over any desired distance may be utilized without in any way detracting from the value of my device as an amusement device.

As the carriage passes along, the revolution of the wheel gives the reciprocatory motion and at the same time carries the carrier backward and forward, at the same time tilting the front of the carrier and elevating the back and then raising the front and depressing the back giving the oscillatory motion to the carrier. In other devices of this kind a stiff jerky motion is imparted to the carrier, making it not at all pleasant to the rider and in no sense the equivalent of the easy and natural motion imparted by the use of my device.

While I have shown the carrier as two horses or animals, it is of course understood that any number from one up may be utilized or the device may comprise a single unit mounted on a suitable carriage and used as a child's toy. The main purposes, however, for which the device is adapted, in my opinion, is as an amusement device for use either in traveling shows or permanent places of amusement such as amusement parks.

No track has been shown upon which the wheel or supporting member of the units travels. It is of course to be understood that it is generally preferable to put sort of a plank or metal track in order to secure a more uniform and pleasant motion and prevent excessive wear of the apparatus.

I am aware that my device is capable of various modifications, all of which are contemplated, however, by my improvements and come within the scope of my invention.

Having thus described my invention, what I claim as new and desire to secure by Letters Patent is:

1. In an amusement device a platform, a wheel support therefor, a wheel mounted thereon, a gear wheel adapted to be operated by the revolution of said wheel, a carrying device, a connecting bar connecting said carrying device to said gear wheel, and a link pivotally secured to said bar and said platform.

2. In an amusement device a platform, a wheel support attached thereto, a wheel mounted thereon, a gear wheel mounted on the shaft of said wheel, a second gear wheel in mesh therewith, a carrying device, a rigid connecting bar connecting said carrying device to said second gear wheel, and a link pivotally secured to said carrying bar and said platform.

3. In an amusement device a platform, a wheel support attached thereto, a wheel mounted thereon, a gear wheel mounted on the shaft of said wheel, a second gear wheel in mesh therewith, a carrying device, a rigid connecting bar connecting said carrying device to said second gear wheel, and a link pivotally secured to said carrying bar and said platform in front of said carrier.

4. In a device of the class described, the combination with a plurality of carrying members, means for securing said carrying members to a traveling cable, said means comprising a rigid connection securing one end of each of said carrying members to the cable and a swinging link connection carrying the opposite end of said carrying members, whereby said members may travel through a curved path without affecting the position of said cable.

In witness whereof, I have hereunto subscribed my name in the presence of two witnesses.

THOMAS O. DECKER.

Witnesses:
C. E. KANE,
ANNE SOLOMON.

Copies of this patent may be obtained for five cents each, by addressing the "Commissioner of Patents, Washington, D. C."